United States Patent
Rotem et al.

(10) Patent No.: US 7,401,241 B2
(45) Date of Patent: Jul. 15, 2008

(54) CONTROLLING STANDBY POWER OF LOW POWER DEVICES

(75) Inventors: Efraim Rotem, Haifa (IL); Alon Naveh, Ramat Hasharon (IL); Avner Kornfeld, Zicron Yaakov (IL); Tsvika Kurts, Haifa (IL)

(73) Assignee: Intel Corporation, Santa Clara, CA (US)

( * ) Notice: Subject to any disclaimer, the term of this patent is extended or adjusted under 35 U.S.C. 154(b) by 299 days.

(21) Appl. No.: 10/875,005

(22) Filed: Jun. 22, 2004

(65) Prior Publication Data
US 2005/0283625 A1    Dec. 22, 2005

(51) Int. Cl.
*G06F 1/32*    (2006.01)
*G06F 1/00*    (2006.01)
*G05F 3/02*    (2006.01)

(52) U.S. Cl. ............ 713/320; 713/300; 327/540
(58) Field of Classification Search ........ 713/320, 713/322, 300, 100; 327/540
See application file for complete search history.

(56) References Cited

U.S. PATENT DOCUMENTS

| | | | |
|---|---|---|---|
| 5,218,705 A | 6/1993 | Deluca et al. | |
| 5,352,935 A * | 10/1994 | Yamamura et al. | 327/540 |
| 6,889,331 B2 * | 5/2005 | Soerensen et al. | 713/320 |
| 7,013,406 B2 * | 3/2006 | Naveh et al. | 713/501 |
| 7,020,786 B2 * | 3/2006 | Vyssotski et al. | 713/300 |
| 7,062,647 B2 * | 6/2006 | Nguyen et al. | 713/100 |
| 2003/0071657 A1 | 4/2003 | Sorensen et al. | |
| 2004/0019815 A1 | 1/2004 | Vyssotski et al. | |
| 2004/0073821 A1 | 4/2004 | Naveh et al. | |

FOREIGN PATENT DOCUMENTS

JP    2000075963 A  *  3/2000

OTHER PUBLICATIONS

42P19741 PCT Search Report and Written Opinion dated Aug. 23, 2005.

* cited by examiner

*Primary Examiner*—Suresh K Suryawanshi
(74) *Attorney, Agent, or Firm*—Molly A. McCall

(57) ABSTRACT

Systems and methods of managing power provide for applying a voltage from a voltage regulator to a component of a computing system and reducing the voltage based on a power saving parameter that is dedicated to the component. The reduction can be in conjunction with the entry of the component into a low power state such as a standby state or an off state, where the power saving parameter defines a voltage such as a minimum operating voltage or minimum sustainable voltage for the component, respectively. In one embodiment, the component is a central processing unit.

32 Claims, 8 Drawing Sheets

CONTROLLING STANDBY POWER OF LOW POWER DEVICES

BACKGROUND

1. Technical Field

One or more embodiments of the present invention generally relate to power management. In particular, certain embodiments relate to reducing the voltage supplied to a computing system component.

2. Discussion

As the trend toward advanced central processing units (CPUs) with more transistors and higher frequencies continues to grow, computer designers and manufacturers are often faced with corresponding increases in power and energy consumption. Furthermore, manufacturing technologies that provide faster and smaller components can at the same time result in increased leakage power. Particularly in mobile computing environments, increased power consumption can lead to overheating, which may negatively affect performance, and can significantly reduce battery life. Because batteries typically have a limited capacity, running the components of a mobile computing system may drain the capacity more quickly than desired.

Some modern mobile computing systems take into consideration the dynamic nature of computer applications in order to conserve battery capacity. For example, many computer applications cause the CPU to consume relatively high power at high performance for short periods of time, while requiring relatively low power operation the rest of the time (e.g., idle while waiting for user input). By limiting the high frequency and high voltage operation of the CPU to the time periods in which high performance is needed, the computing system can conserve a significant amount of power. For example, when the CPU anticipates being idle, the CPU can instruct the voltage regulator to drop the core voltage to a minimum operating voltage. Similarly, when the CPU is to be turned off, the core voltage can be further dropped to a minimum sustainable voltage that is programmed into the voltage regulator during the CPU manufacturing or board assembly process. The minimum sustainable voltage maintains the internal state of the CPU. Since active and leakage power are closely related to voltage, reducing the voltage can enable greater power savings, lower temperatures and longer battery life. While the above approach has been acceptable under certain circumstances, there still remains considerable room for improvement.

In particular, manufactured components tend to exhibit slightly different characteristics from one part to the next. For example, two CPU parts resulting from the same manufacturing process may have different minimum sustainable voltages. Conventional power management approaches, however, select a "worst case" minimum sustainable voltage for all CPUs of a given type and use this value to program the voltage regulator. Thus, a non-optimal minimum sustainable voltage is shared among all instances of a given computing system component. The same is true for other power saving parameters such as the minimum operating voltage. As a result, the majority of parts use non-optimal power saving parameters, which often results in missed power saving opportunities. Furthermore, conventional approaches do not permit the CPU to change the preset minimum value and therefore have limited ability to tailor the voltage regulator to individual components rather than a group of components.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
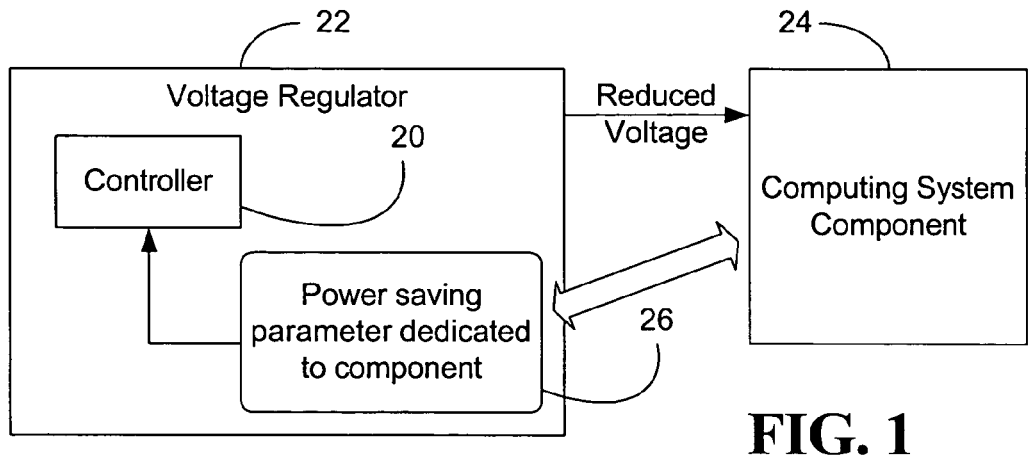
FIG. 1 is a block diagram of an example of a power management apparatus according to one embodiment of the invention.

FIG. 1 shows an apparatus having a controller 20, which applies a voltage from a voltage regulator 22 to a component 24 of a computing system (not shown). While certain embodiments will be described with regard to a computing system component that is a central processing unit (CPU), the embodiments of the invention are not so limited. Indeed, the component 24 could include core logic, a dynamic random access memory (DRAM), a modem, a hard disk drive (HDD), a compact disk read only memory (CDROM), or any other computing system component for which power management is an issue of concern. Notwithstanding, there are a number of aspects of CPUs for which the embodiments of the invention are well suited. Similarly, the voltage regulator 22 may include a switching regulator having a metal oxide semiconductor field effect transistor (MOSFET) driver, a switching transistor stack, a bulk capacitor, etc., but other types of voltage regulators can be used without parting from the spirit and scope of the embodiments of the invention. The voltage regulator 22 and computing system component 24 may be on the same or separate dies.

In conjunction with a transition of the component 24 to a low power state, the controller 20 is able to reduce the voltage applied to the component 24 based on a power saving parameter 26 that is dedicated to the component 24. The power saving parameter 26 may be a minimum sustainable voltage, which maintains the internal state of the component 24, a minimum operating voltage, and so on. Thus, the power saving parameter 26 might be a voltage level such as 620 mV or 530 mV. The power saving parameter 26 could also be a power optimized value that is not necessarily the minimum voltage level. For example, it may be determined that although the actual minimum sustainable voltage for a part is 700 mV, a voltage of 750 mV should be used because such a voltage is optimal from the perspective of some other power saving parameter.

Figure 2:
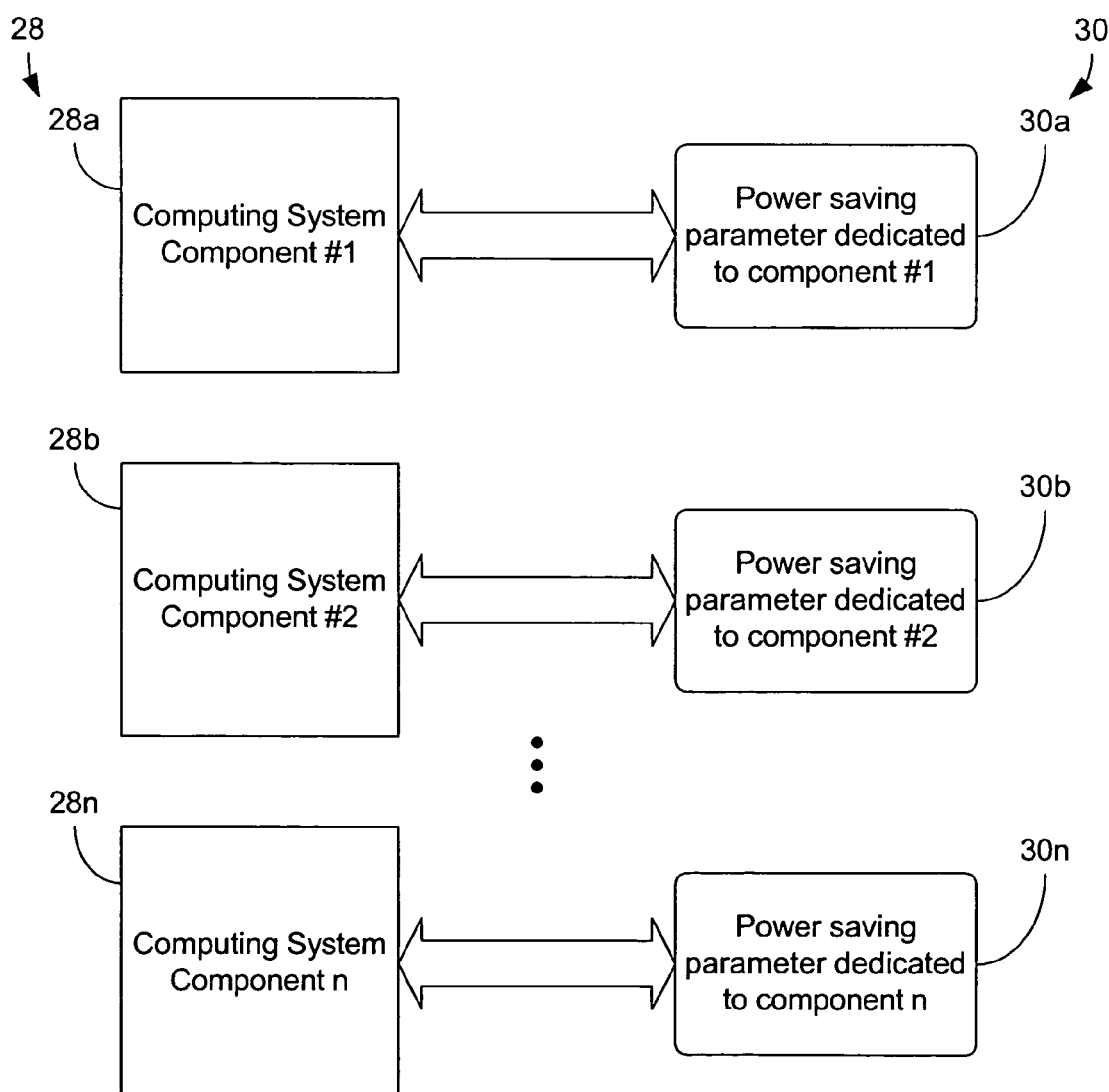
FIG. 2 is a block diagram of an example of a plurality of computing system components having dedicated power saving parameters according to one embodiment of the invention.

By dedicating the power saving parameter 26 to the component 24, the illustrated approach enables the parameter 26 to be closely tailored to the individual characteristics of the component 24. This point is more clearly demonstrated in FIG. 2, which shows a plurality of computing system components 28 (28a-28n) having a corresponding plurality of power saving parameters 30 (30a-30n), where each power saving parameter 28 is dedicated to its corresponding component 28. Thus, the components 28 do not share a power saving parameter that is non-optimal to one or more of the individual components. For example, the component 28b may be able to support a minimum voltage that is lower than the minimum voltage supported by the component 28a. In such a case, the power saving parameter 30b would reflect the lower minimum voltage, which in turn would enable reduced leakage current and greater power savings for the component 28a. Simply put, each computing system component 28 is able to have a low power mode that is based on its own internal characteristics.

Figure 3A:
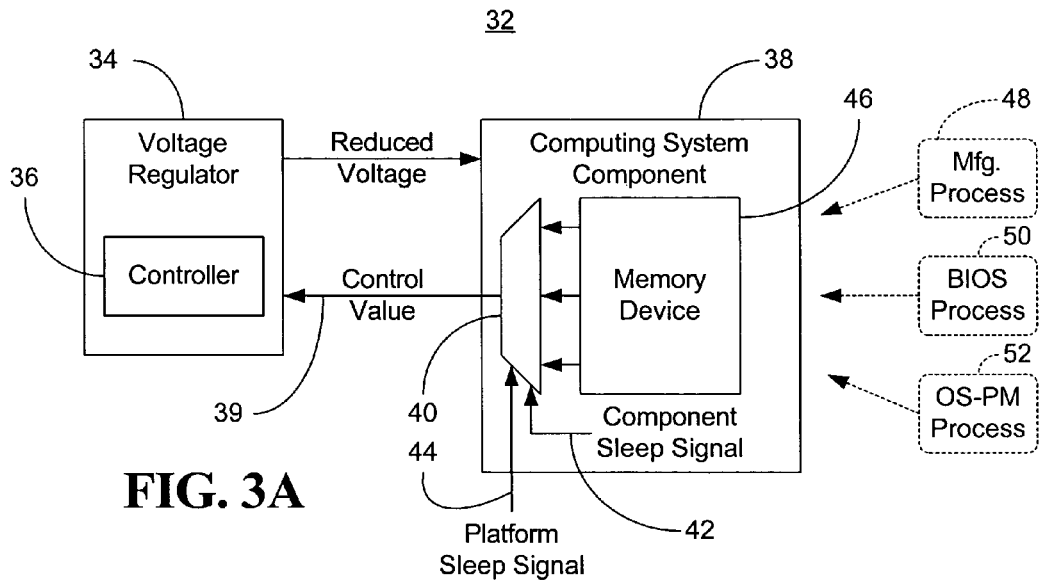
FIG. 3A is a block diagram of an example of a computing system component according to one embodiment of the invention.

Turning now to FIG. 3A, an architecture 32 is shown in which a voltage regulator 34 has a controller 36 that applies a voltage from the voltage regulator 34 to a computing system component 38 and reduces the applied voltage based on a power saving parameter that is dedicated to the component 38. In the illustrated example, the component 38 includes multiplexing logic 40 that receives a notification of a power saving event and identifies the power saving parameter based on the notification. The notification, which may be provided to the multiplexing logic 40 by way of a component sleep signal 42, a platform sleep signal 44, etc., could inform the multiplexing logic 40 of the component 38 entering an idle (e.g., standby) state, an off state or some other type of low power state. If the power saving event corresponds to the component 38 entering an idle state, the multiplexing logic 40 might identify a minimum operating voltage as the power saving parameter. Alternatively, if the power saving event corresponds to the component 38 entering an off state, the multiplexing logic 40 could identify a minimum sustainable voltage as the power saving parameter. In either case, the identified voltage is dedicated to the component 38 and reflects the actual characteristics of the component 38 rather than a "worst case" value that is shared among multiple components.

The multiplexing logic 40 determines a control value 39 for the power saving parameter and applies the control value 39 to the voltage regulator 34 to reduce the voltage. The control value 39 can essentially establish a reference voltage to be used to control the internal switching of the voltage regulator 34.

The illustrated component 38 also includes a memory device 46, where the component 38 receives the power saving parameter from a process such as a manufacturing process 48, a basic input/output system (BIOS) process 50, an operating system-directed power management (OS-PM) process 52, etc., and stores the power saving parameter to the memory device 46. One example of the manufacturing process 48 would be a component manufacturing process in which the component 38 is fabricated and tested, and power saving parameter data is written to the memory device 46 based on the testing results. Another example of the manufacturing process 48 could be a board assembly process in which the component 38 is tested at the time of its assembly together with other components on a circuit board and the power saving parameter data is stored to the memory device 46.

The memory device 46 could be a register, programmable fuse, erasable programmable read only memory (EPROM/Flash), or any other suitable type of memory device. It should be noted that, depending upon the circumstances, multiple power saving parameters could be stored to the memory device 46, where the multiplexing logic 40 selects the appropriate parameter based on the notification received. It should also be noted that using the memory device 46 to store the power saving parameter data provides much greater flexibility than conventional approaches because the voltage regulator 34 can be effectively be programmed long after the manufacturing process. Indeed, the control value 39 can be based on a power saving parameter that changes throughout the life cycle of the architecture 32. For example, the OS-PM process 52 could determine that the power saving parameter should be increased due to deterioration of the component 38 over time. In such a case, the power saving parameter can be readily modified by storing a different value to the memory device 46.

Figure 8:
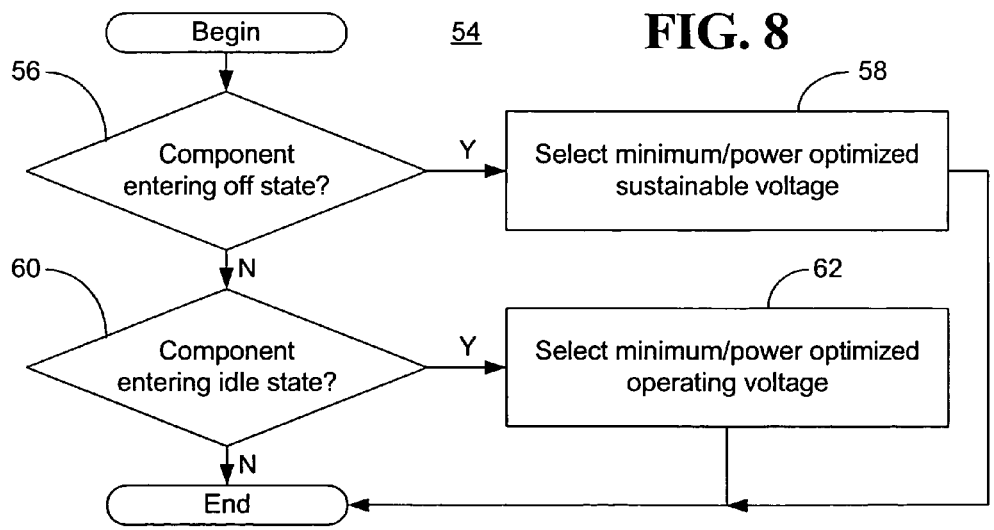
FIG. 8 is a flowchart of an example of a process of selecting a power saving parameter according to one embodiment of the invention.

FIG. 8 shows a process of identifying a power saving parameter at 54. The process 54 could be implemented in the multiplexing logic 40 (FIG. 3A) of the computing system component using any suitable hardware and/or software programming technique. For example, the process 54 may be implemented as an application specific integrated circuit (ASIC), as a set of instructions to be stored on a machine readable medium, or any combination thereof. In particular, the illustrated processing block 56 provides for determining whether the component is entering an off state based on the notification signal. If so, the minimum sustainable voltage for the component is selected at block 58. Processing block 60 provides for determining whether the component is entering an idle state based on the notification signal. If so, the minimum operating voltage is selected at block 62. Other minimum and/or power optimized voltages could also be used.

Figure 3B:
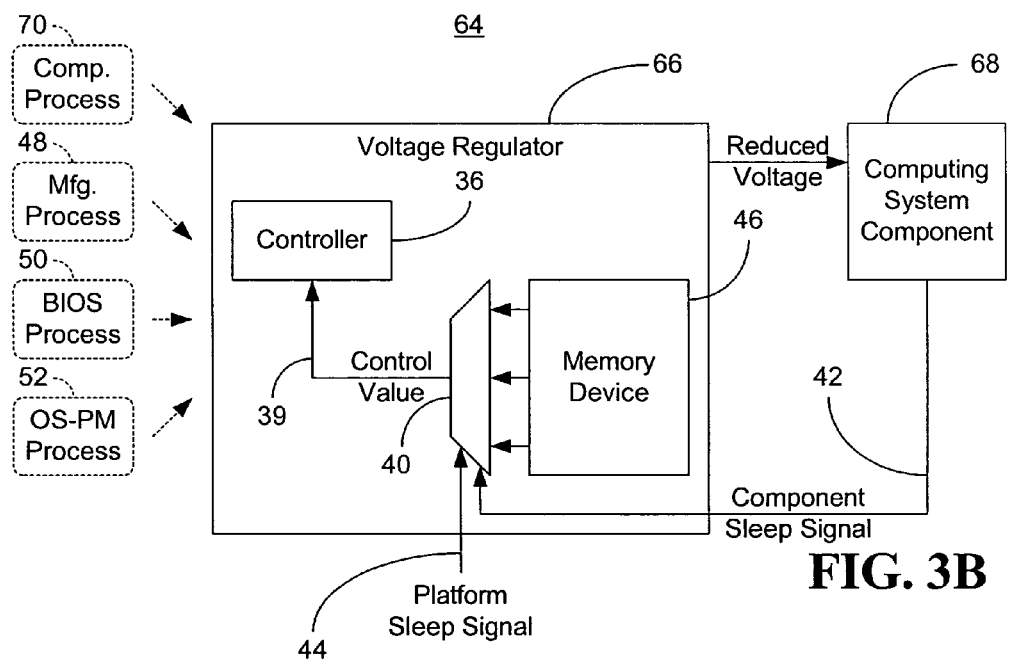
FIG. 3B is a block diagram of an example of a voltage regulator according to one embodiment of the invention.

FIG. 3B demonstrates that an alternative architecture 64 can be used in which the multiplexing logic 40 and memory device 46 are incorporated into a voltage regulator 66. In this embodiment, although the voltage regulator 66 still reduces the voltage applied to a computing system component 68 based on a power saving parameter that is dedicated to the component 68, the data relating to the power saving parameter is stored on the voltage regulator 66 rather than the computing system component 68. The power saving parameter value can be received from a manufacturing process 48, a BIOS process 50 or an OS-PM process 52, and can be subsequently changed as already discussed. The power saving parameter can also be received from a process 70 of the computing system component 68. As also already discussed, the voltage reduction is in response to a notification that may be provided to the multiplexing logic 40 by way of a component sleep signal 42, a platform sleep signal 44, etc.

Figure 4A:
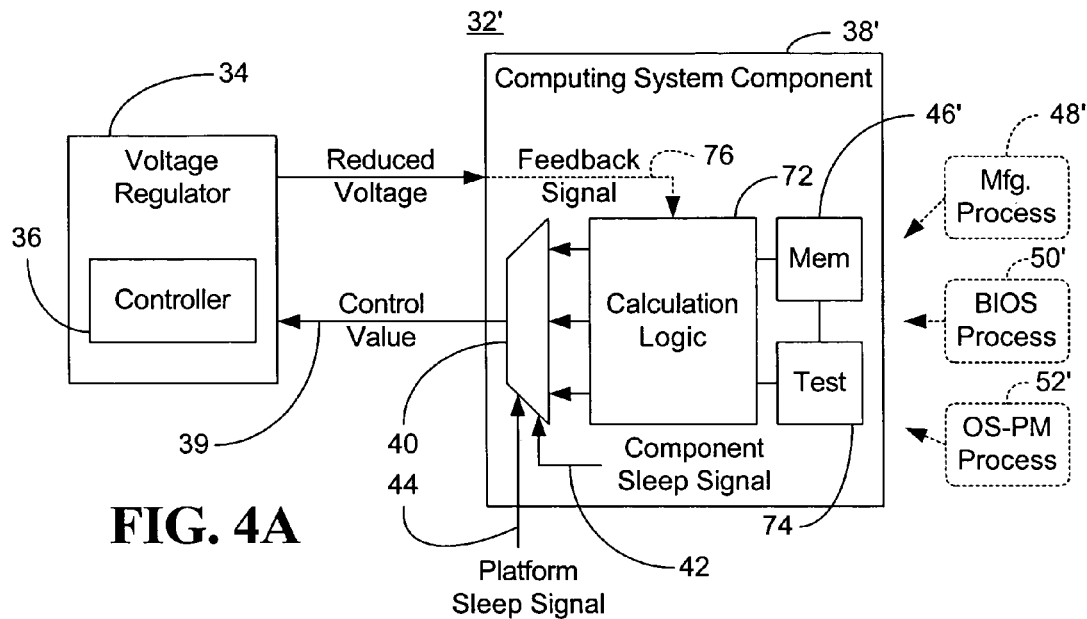
FIG. 4A is a block diagram of an example of a computing system component according to an alternative embodiment of the invention.

Turning now to FIG. 4A, an alternative approach to determining the power saving parameter is shown at architecture 32'. In particular, the architecture 32' includes a computing system component 38' with calculation logic 72 to retrieve one or more operational values from a memory device 46' and calculate the power saving parameter based the operational values. The operational values could be test results, fabrication process parameters, etc. For example, multiple voltages could be applied to the component 38', where one or more units of the component 38' are tested for failure. In the case of a CPU, one such unit might be a cache system (not shown), which is known to be one of the first units to fail if the core voltage of the CPU is too low. Thus, a set of operational values might reflect the test results: 200 mV, fail; 300 mV; fail; 400 mV, fail; 520 mV, pass . . . In such a case, the calculation logic 72, could extrapolate from the operational values to identify a minimum sustainable voltage that is between 400 mV and 520 mV. Alternatively, the calculation logic 72 could merely select the lowest pass value (e.g., 520 mV) as the minimum sustainable voltage.

While the operational values could be received from an external process such as a manufacturing process 48', a BIOS process 50' or an OS-PM process 52', as already discussed, an alternative approach would be to provide the component 38' with test logic 74 to measure the operational values in accordance with a self-test of the component 38'. The self-test could be similar to a power on self-test (POST), which is a diagnostic testing sequence run by the BIOS as the system's power is initially turned on. Although the POST typically determines whether the system's random access memory (RAM), disk drives, peripheral devices and other hardware components are working properly, the self-test could provide for testing of the CPU to determine the above-described operating values. The self-test could also include an iterative process in which increasingly higher voltages are applied to the component 38' until the component 38' passes. The voltage resulting in the successful iteration can be used as the power saving parameter.

The illustrated calculation logic 72 can also determine the power saving parameter based on a feedback signal 76, which is derived from the voltage received from the voltage regulator 34. Such a closed-loop approach would further enhance the reliability of the architecture 32'.

It should also be noted that the test logic 74 could alternatively measure the power saving parameter directly. In such a case, the power saving parameter can be provided to the multiplexing logic 40 from either the test logic 74 or the memory device 46', where the calculation logic 72 would not be necessary.

Figure 4B:
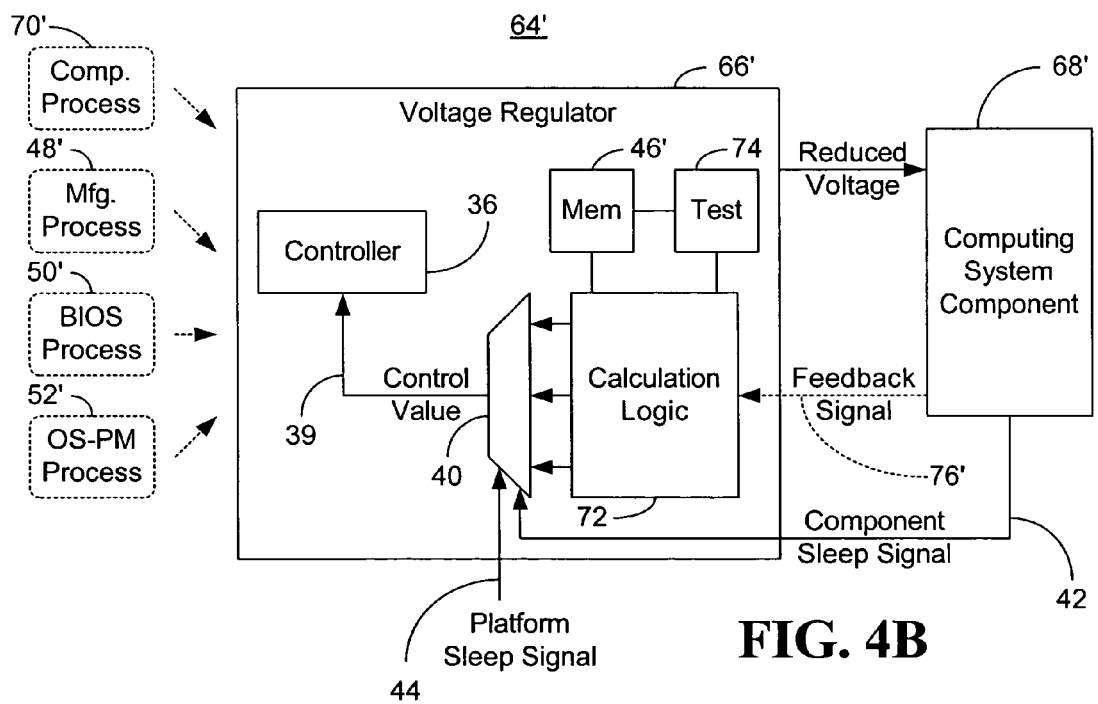
FIG. 4B is a block diagram of an example of a voltage regulator according to an alternative embodiment of the invention.

FIG. 4B shows another alternative embodiment in which an architecture 64' has a voltage regulator 66' with the calculation logic 72, memory device 46' and test logic 74 discussed above. In such a case, the operational values could be obtained internally from the test logic 74 or externally from a computing system component process 70', manufacturing process 48', BIOS process 50', OS-PM process 52', etc. The calculation logic 72 may also base the power saving parameter on a feedback signal 76' from the computing system component 68'. For example, the test logic 74 could use the feedback signal 76' to determine whether a given voltage has resulted in a failure.

Figure 5:
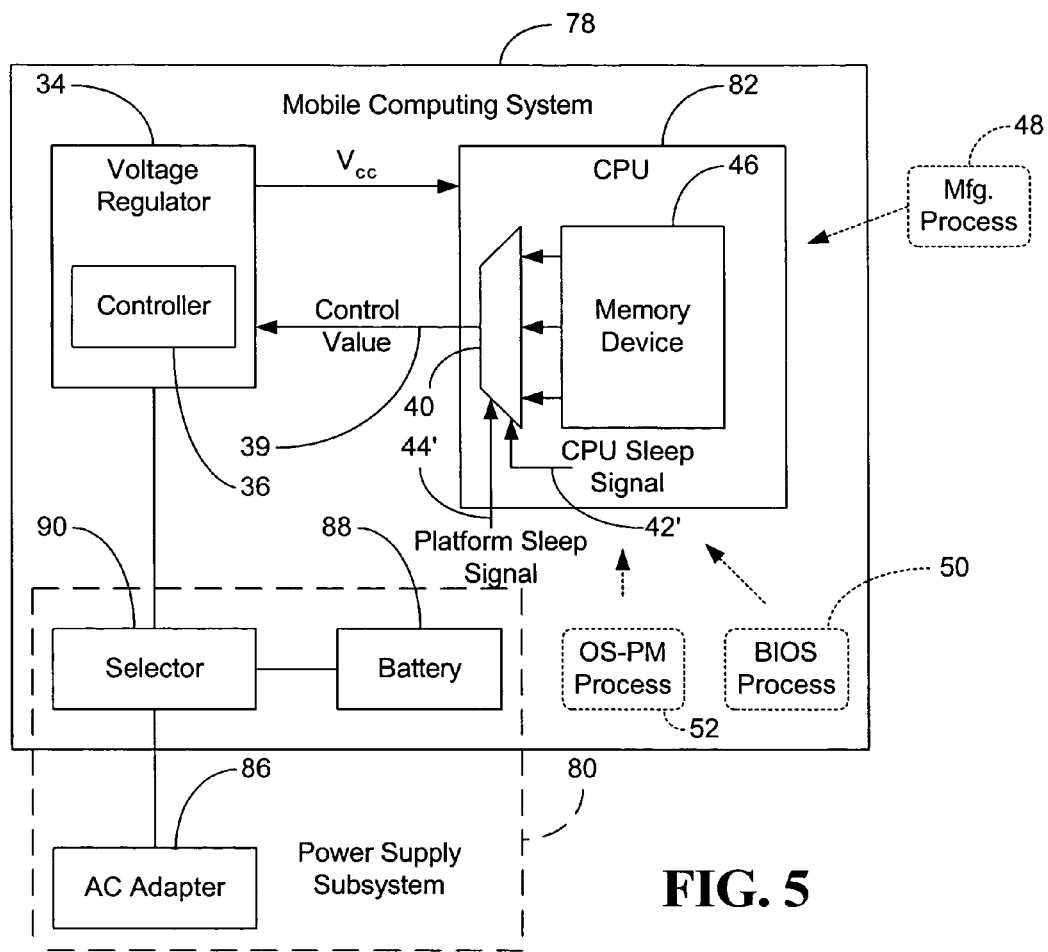
FIG. 5 is a block diagram of an example of a mobile computing system according to one embodiment of the invention.

Turning now to FIG. 5, a particular implementation is shown in which many of the above-described features are incorporated into a mobile computing system 78. The mobile computing system 78 may be a notebook personal computer (PC), a personal digital assistant (PDA), a wireless "smart" phone and so on. The illustrated system 78 includes a power supply subsystem 80, a CPU 82 and a voltage regulator 34 coupled to the power supply subsystem 80 and the CPU 82. The power supply subsystem 80 includes an alternating current (AC) adaptor 86, which converts an AC voltage into a direct current (DC) voltage, a battery 88, which provides a DC voltage, and a selector 90, which selects between the AC adaptor 86 and the battery 88 as a source of power for the mobile computing system 78. The voltage regulator 34 steps the voltage from the selector 90 down to the desired core voltage $V_{cc}$.

The illustrated system 78 is similar to that of the architecture 32 (FIG. 3A) described above in that the voltage regulator 34 has a controller 36 that is capable of applying a voltage such as the core voltage to the CPU 82 and reducing the core voltage based on a power saving parameter that is dedicated to the CPU 82. In this embodiment, the CPU 82 includes the multiplexing logic 40, which receives a notification of a power saving event by way of a CPU sleep signal 42' or a platform sleep signal 44' and identifies the power saving parameter based on the notification. The multiplexing logic 40 determines the control value 39 for the identified power saving parameter and applies the control value 39 to the voltage regulator 34 to reduce the core voltage. In the illustrated example, data relating to the minimum control parameter can be received from a BIOS process 50 or OS-PM process 52 associated with the platform, or a manufacturing process 48 that is separate from the platform. As already noted, the voltage regulator 34 and CPU 82 may be incorporated into the same die or different dies. While the illustrated system 78 most nearly resembles the architecture 32 (FIG. 3A), the system 78 could be readily modified to more closely reflect the architecture 64 (FIG. 3B), the architecture 32' (FIG. 4A), the architecture 64' (FIG. 4B), or any combination thereof.

Figure 6:
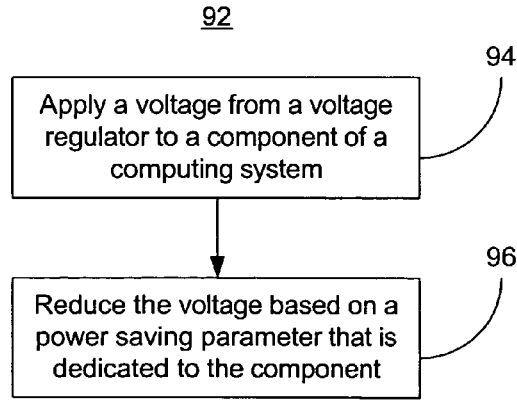
FIG. 6 is a flowchart of an example of a method of managing power according to one embodiment of the invention.

Turning now to FIG. 6, a method 92 of managing power is shown. The method 92 can be implemented in a computing system using any suitable hardware and/or software programming technique. For example, the method may be implemented as fixed functionality hardware, an application specific integrated circuit (ASIC), as a set of instructions to be stored on a machine readable medium, or any combination thereof. In particular the method 92 provides for applying a voltage from a voltage regulator to a component of a computing system at processing block 94. The voltage is reduced at block 96 based on a power saving parameter that is dedicated to the component. As already noted, the power saving parameter could include a power saving voltage level such a minimum/power optimized sustainable voltage or a minimum/power optimized operating voltage.

Figure 7A:
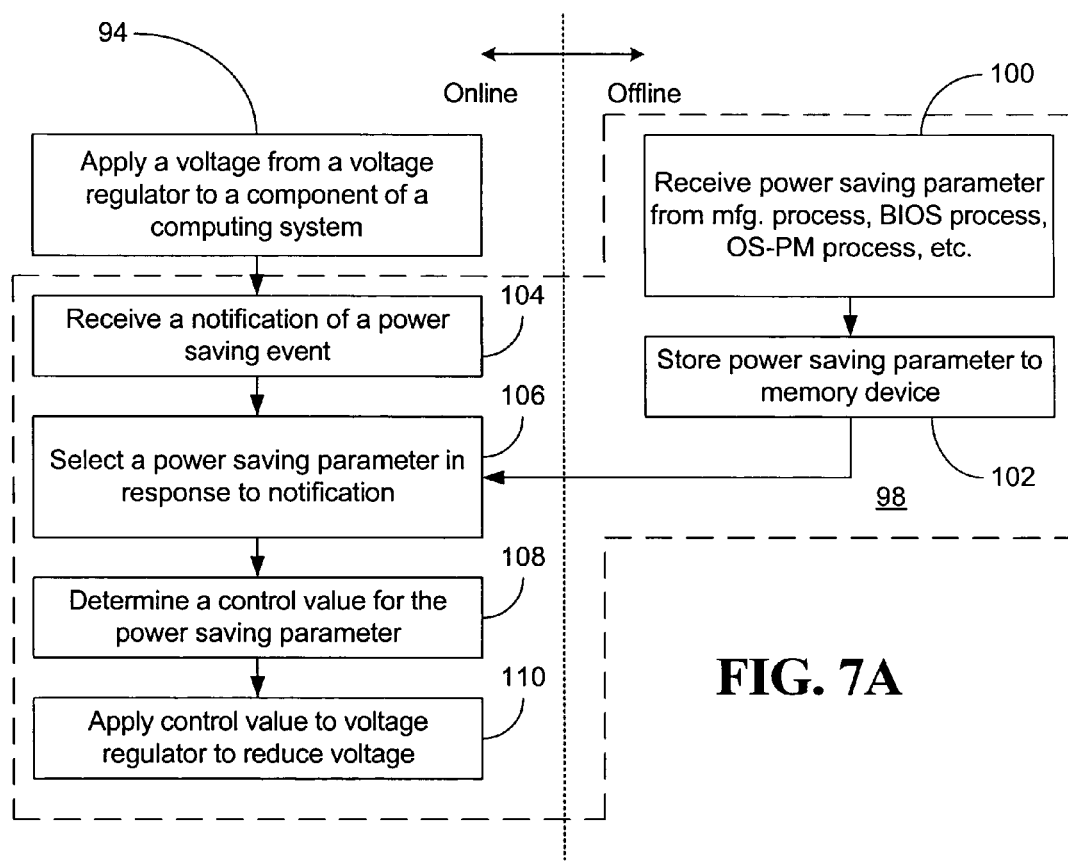
FIGS. 7A through 7D are flowcharts of examples of processes of reducing voltage according to embodiments of the invention.

FIG. 7A shows one approach to reducing a voltage to a computing system component in greater detail at block 98. Block 98 can therefore be readily substituted for block 96 (FIG. 6) discussed above. In the illustrated example, reducing voltage can include "online" processes as well as "offline" processes. For example, block 100 demonstrates that one approach is to receive the power saving parameter from a process such as a manufacturing process, a BIOS process, an OS-PM process, etc., offline. The power saving parameter is stored to a memory device at block 102, which can also be performed offline.

The remaining processes of the illustrated block 98 are conducted online. In particular, block 104 provides for receiving a notification of a power saving event and block 106 provides for selecting a power saving parameter in response to the notification. A control value for the power saving parameter is determined at block 108 and the control value is applied to the voltage regulator at block 110 to reduce the voltage.

Figure 7B:
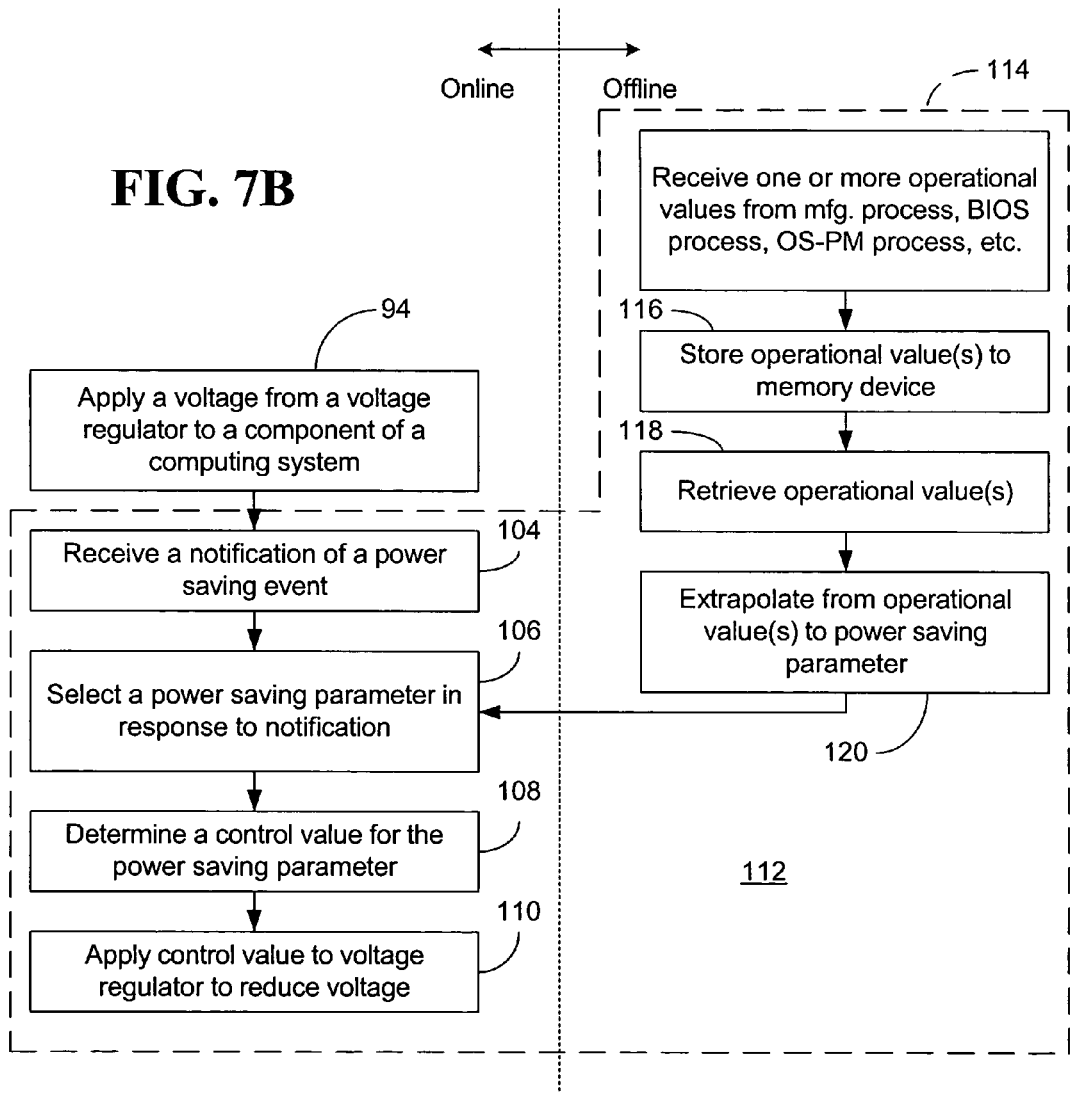

Turning now to FIG. 7B, an alternative approach to reducing the voltage to the computing system component is shown at block 112. Thus, block 112 can also be substituted for block 96 (FIG. 6) discussed above. It can be seen that the online processes have not changed from the discussion of block 98 (FIG. 7A), but that the offline processes have changed. For example, block 114 provides for receiving one or more operational values rather than the power saving parameter itself. The operational values are stored to a memory device at block 116 and retrieved from the memory device at block 118.

Block 120 provides for extrapolating from the operational values to the power saving parameter.

Figure 7C:
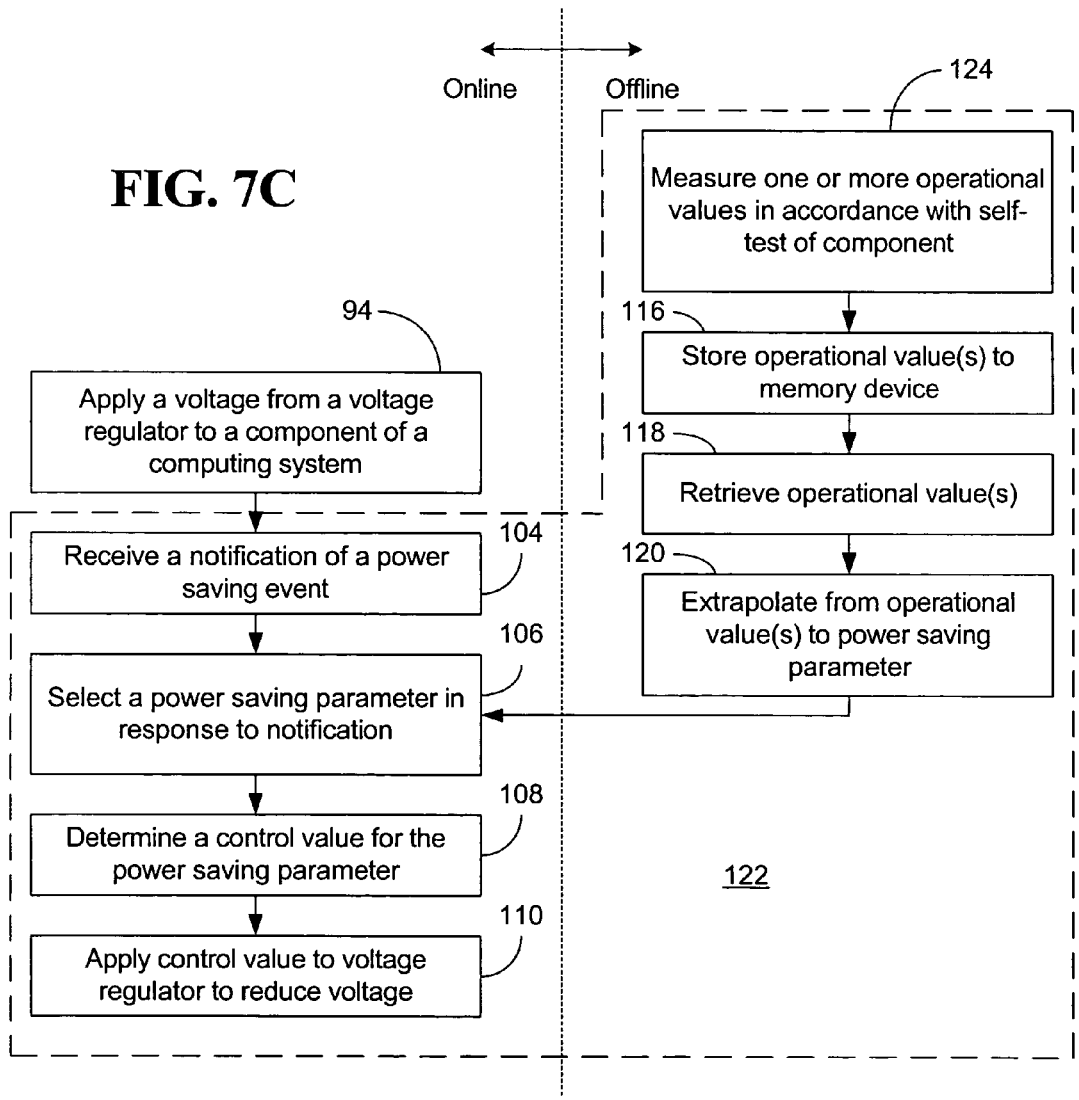

FIG. 7C illustrates yet another approach to reducing the voltage to the computing system at block 122, which can be substituted for block 96 (FIG. 6) discussed above. This embodiment is identical to the block 112 (FIG. 7B) discussed above, except that the operational values are measured in accordance with a self-test of the component at block 124.

Figure 7D:
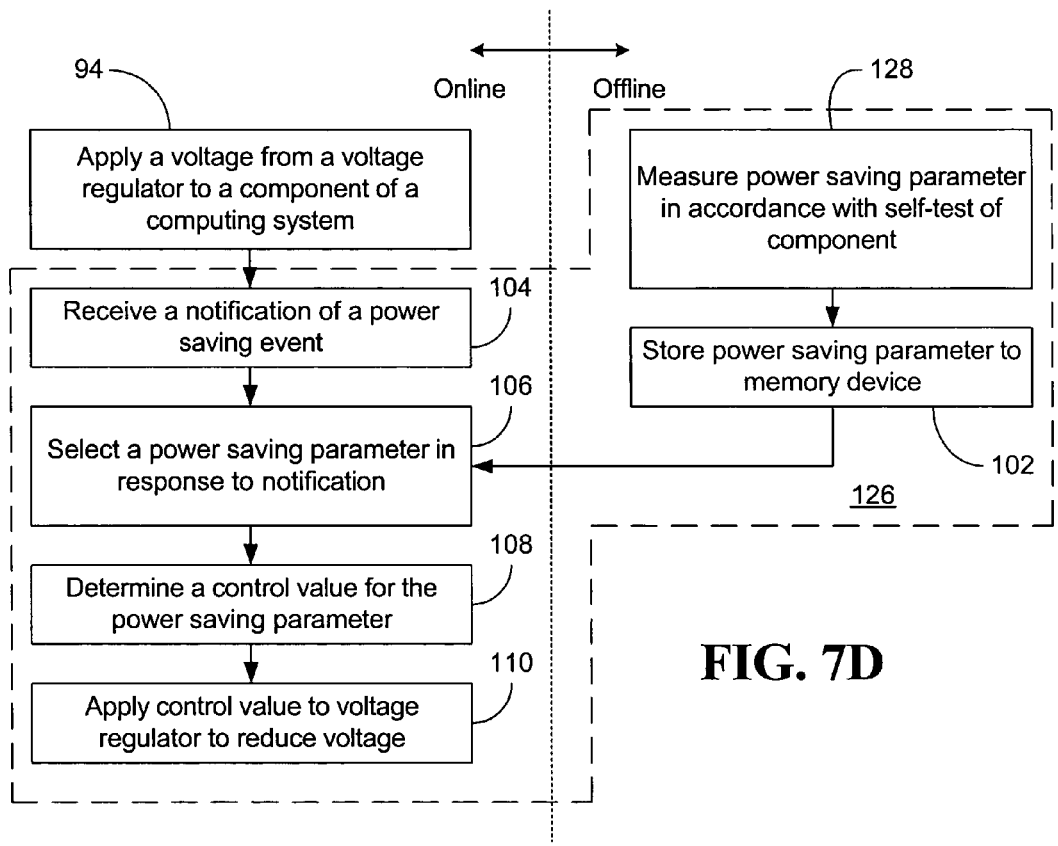

FIG. 7D shows an additional approach to reducing the voltage to the computing system component at block 126, where block 126 can also be substituted for block 96 (FIG. 6) discussed above. In particular, block 126 is identical to block 98 (FIG. 7A), except that the power saving parameter is measured at block 128 in accordance with a self-test of the component rather than received from a process such as a manufacturing, BIOS or OS-PM process.

The techniques described herein therefore provide a unique approach to power management that enables greater power conservation, longer battery life, lower temperatures and enhanced performance. For example, dedicating power saving parameters to computing system components allow each component to be optimized based on its own characteristics. Furthermore, enabling the computing system component to communicate the appropriate power saving parameter to the voltage regulator provides greater flexibility in achieving maximum power savings.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method comprising:
applying a voltage from a voltage regulator to a component of a computing system; and
reducing the voltage based on a power saving parameter that is dedicated to the component, wherein reducing the voltage includes:
receiving a notification of a power saving event;
selecting the power saving parameter based on the notification; and
modifying the power saving parameter based on a deterioration of the component.

2. The method of claim 1, further including:
receiving the power saving parameter from either a manufacturing process, a basic input/output system (BIOS) process or an operating system-directed power management (OS-PM) process;
storing the power saving parameter to a memory device;
determining a control value for the power saving parameter; and
applying the control value to the voltage regulator to reduce the voltage.

3. The method of claim 1, further including calculating the power saving parameter based on one or more operational values.

4. The method of claim 3, further including:
receiving the operational values from either a manufacturing process, a basic input/output system (BIOS) process or an operating system-directed power management (OS-PM) process;
storing the operational values to a memory device;
retrieving the operational values from the memory device; and
extrapolating from the operational values to the power saving parameter.

5. The method of claim 3, further including:
measuring the operational values in accordance with a self-test of the component;
storing the operational values to a memory device;
retrieving the operational values from the memory device; and
extrapolating from the operational values to the power saving parameter.

6. The method of claim 1, further including:
measuring the power saving parameter in accordance with a self-test of the component; and
storing the power saving parameter to a memory device.

7. The method of claim 1, wherein reducing the voltage further includes:
determining a control value for the power saving parameter; and
applying the control value to the voltage regulator to reduce the voltage.

8. The method of claim 1, wherein receiving the notification includes receiving a notification of the component entering an off state, the power saving parameter including a minimum sustainable voltage.

9. The method of claim 1, wherein receiving the notification includes receiving a notification of the component entering an idle state, the power saving parameter including a minimum operational voltage.

10. The method of claim 1, wherein the reducing includes reducing the voltage based on a feedback signal from the voltage regulator.

11. The method of claim 1, wherein the applying includes applying a core voltage to a central processing unit.

12. An apparatus comprising:
a controller to apply a voltage from a voltage regulator to a component of a computing system and reduce the voltage based on a power saving parameter that is dedicated to the component; and
multiplexing logic to receive a notification of a power saving event and select the power saving parameter based on the notification,
wherein the apparatus is to modify the power saving parameter based on a deterioration of the component.

13. The apparatus of claim 12, further including a memory device, the apparatus to receive the power saving parameter from either a manufacturing process, a basic input/output system (BIOS) process or an operating system-directed power management (OS-PM) process and store the power saving parameter to the memory device.

14. The apparatus of claim 12, further including calculation logic to calculate the power saving parameter based on one or more operational values.

15. The apparatus of claim 14, further including a memory device, the apparatus to receive the operational values from either a manufacturing process, a basic input/output system (BIOS) process or an operating system-directed power management (OS-PM) process, and store the operational values to the memory device, the calculation logic to retrieve the operational values from the memory device and extrapolate from the operational values to the power saving parameter.

16. The apparatus of claim 14, further including:
test logic to measure the operational values in accordance with a self-test of the component; and
a memory device, the apparatus to store the operational values to the memory device, the calculation logic to retrieve the operational values from the memory device and extrapolate from the operational values to the power saving parameter.

17. The apparatus of claim 12, further including:
test logic to measure the power saving parameter in accordance with a self-test of the component; and
a memory device, the apparatus to store the power saving parameter to the memory device.

18. The apparatus of claim 12, wherein the multiplexing logic is to determine a control value for the power saving parameter and apply the control value to the voltage regulator to reduce the voltage.

19. The apparatus of claim 12, wherein the power saving event is to include the component entering an off state and the power saving parameter is to include a minimum sustainable voltage.

20. The apparatus of claim 12, wherein the power saving event is to include the component entering an idle state and the power saving parameter is to include a minimum operational voltage.

21. A system comprising:
a power supply subsystem;
a central processing unit (CPU); and
a voltage regulator coupled to the power supply subsystem and the CPU, the voltage regulator having a controller to apply a core voltage from the voltage regulator to the CPU and reduce the voltage based on a power saving parameter that is dedicated to the CPU, wherein the CPU includes multiplexing logic to receive a notification of a power saving event and select the power saving parameter based on the notification, and wherein the system is to modify the power saving parameter based on a deterioration of the CPU.

22. The system of claim 21, wherein the CPU further includes a memory device, the CPU to receive the power saving parameter from either a manufacturing process, a basic input/output system (BIOS) process or an operating system-directed power management (OS-PM) process and store the power saving parameter to the memory device.

23. The system of claim 21, wherein the CPU further includes calculation logic to calculate the power saving parameter based on one or more operational values.

24. The system of claim 23, further including a memory device, the CPU to receive the operational values from at lease one of a manufacturing process, a basic input/output system (BIOS) process or an operating system-directed power management (OS-PM) process, and store the operational values to the memory device, the calculation logic to retrieve the operational values from the memory device and extrapolate from the operational values to the power saving parameter.

25. The system of claim 23, wherein the CPU further includes:
test logic to measure the operational values in accordance with a self-test of the CPU; and
a memory device, the CPU to store the operational values to the memory device, the calculation logic to retrieve the operational values from the memory device and extrapolate from the operational values to the power saving parameter.

26. The system of claim 21, wherein the CPU further includes:
test logic to measure the power saving parameter in accordance with a self-test of the CPU; and
a memory device, the CPU to store the power saving parameter to the memory device.

27. The system of claim 21, wherein power saving event is to include the CPU entering an off state and the power saving parameter is to include a minimum sustainable voltage.

28. The system of claim 21, wherein the power saving event is to include the CPU entering an idle state and the power saving parameter is to include a minimum operational voltage.

29. A method comprising:
receiving a power saving parameter from either a manufacturing process, a basic input/output system (BIOS) process or an operating system-directed power management (OS-PM) process;
storing the power saving parameter to a memory device;
applying a voltage from a voltage regulator to a component of a computing system;
receiving a notification of a power saving event;
selecting the power saving parameter based on the notification;
determining a control value for the power saving parameter; and
applying the control value to the voltage regulator to reduce the voltage based on the power saving parameter, the power saving parameter being dedicated to the component, wherein reducing the voltage includes modifying the power saving parameter based on a deterioration of the component.

30. The method of claim 29, wherein receiving the notification includes receiving a notification of the component entering an off state, the power saving parameter including a minimum sustainable voltage.

31. The method of claim 29, wherein receiving the notification includes receiving a notification of the component entering an idle state, the power saving parameter including a minimum operational voltage.

32. The method of claim 29, wherein the applying includes applying a core voltage to a central processing unit.

* * * * *